May 12, 1953 F. T. HAGUE 2,637,975
AIR DISPERSION INLET MEANS FOR COMBUSTION APPARATUS
Filed June 3, 1950
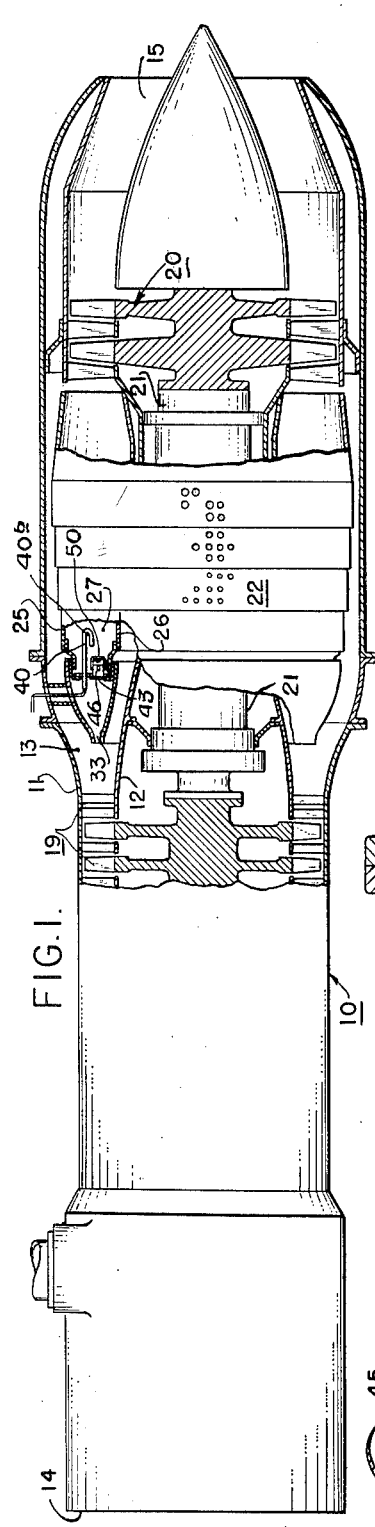
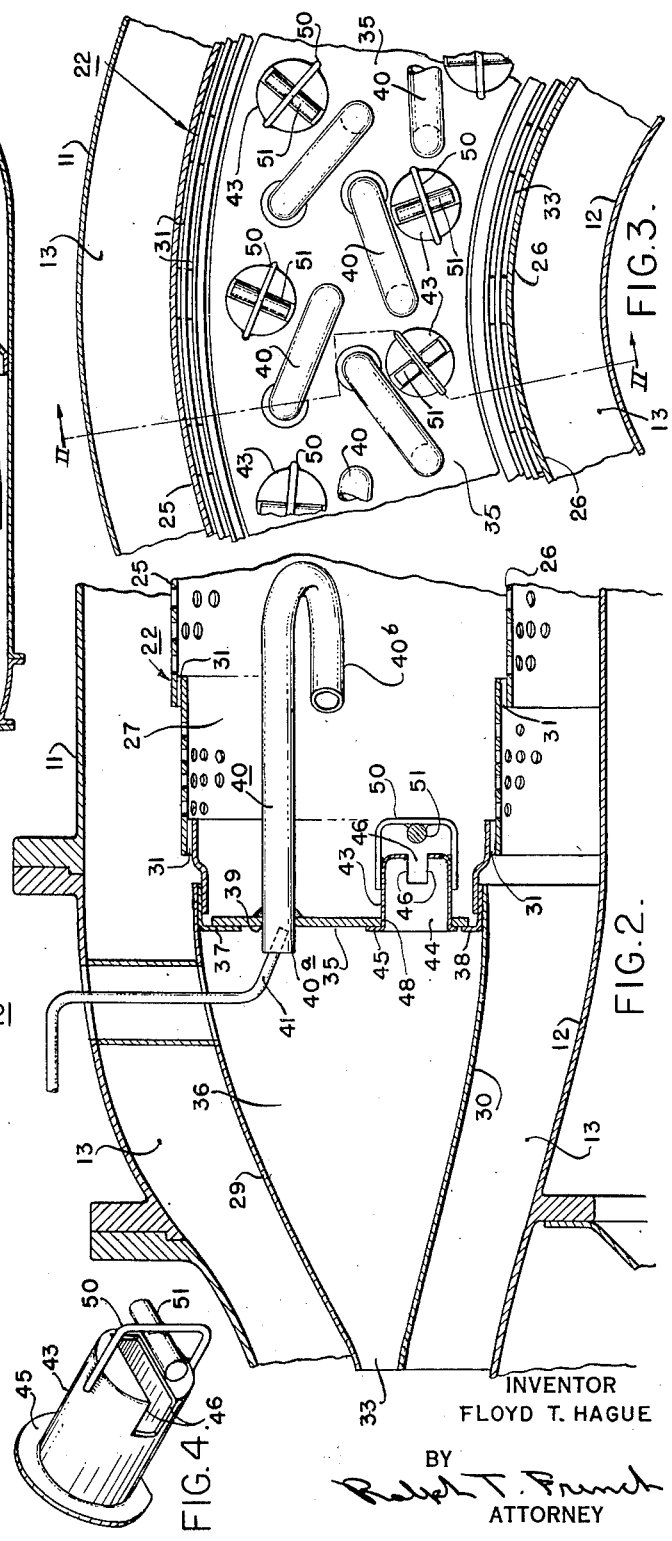
INVENTOR
FLOYD T. HAGUE
BY
Robert T. French
ATTORNEY Patented May 12, 1953

2,637,975

UNITED STATES PATENT OFFICE 2,637,975

AIR DISPERSION INLET MEANS FOR COMBUSTION APPARATUS

Floyd T. Hague, Drexel Hill, Pa., assignor to Westinghouse Electric Corporation, East Pittsburgh, Pa., a corporation of Pennsylvania Application June 3, 1950, Serial No. 165,927

2 Claims. (Cl. 60—39.65)

This invention relates to combustion apparatus, and particularly to fluid fuel combustion apparatus for an aviation power plant adapted for operation at high altitudes.

In high altitude operation of the combustion apparatus of an aviation power plant such as a turbojet engine, the maintenance of the flame reaction at any efficient rate tends to become critical, due in part to the reduced pressure and temperature conditions of the atmosphere. It has been proposed to effect supply of preheated, substantially vaporized fuel mixed with primary air in a predetermined ratio to the combustion chamber of such an equipment, with provision of suitable means for ensuring adequate turbulence in the mixture to promote rapid flame propagation. One object of the present invention is to provide improved means for effecting turbulence in primary air flowing into the combustion chamber adjacent the point of admission of fuel.

It is known that properly controlled turbulence in the combustion zone is effective to increase the rate of flame propagation and consequently to shorten flame length in a combustion chamber. Another object of the invention is the provision of improved primary air inlet means for promoting controlled turbulence of the air and fuel mixture to minimize the length of the flame in a turbojet power plant.

Features of the invention may be utilized to particular advantage in combination with an annular combustor of the type equipped with axially disposed fuel supply tubes, the inlet ends of which receive fluid fuel along with limited flow of primary air, and the retrorse outlet ends of which are adapted to extend into the combustion zone for effecting preheating of a rich fuel and air mixture, which is discharged therefrom in a counterflow direction, and then mixed with other primary air that is supplied to the combustion chamber by way of improved turbulence-promoting ducts constructed in accordance with the invention.

These and other objects are effected by the invention as will be apparent from the following description and claims taken in connection with the accompanying drawing, forming a part of this application, in which:

Fig. 1 is a longitudinal diagrammatic view, partly in section, of a typical aviation gas turbine engine equipped with combustion apparatus which embodies the invention;

Fig. 2 is a fragmentary, enlarged detail, sectional view, taken along line II—II of Fig. 3, and showing a portion of the combustion apparatus shown in Fig. 1;

Fig. 3 is a fragmentary sectional view of a portion of the combustion apparatus shown in Fig. 1; and Fig. 4 is an enlarged perspective view of one of the air inlet ducts constructed in accordance with the invention.

Referring to Fig. 1 of the drawing, a typical gas turbine power plant 10, with which the invention is adapted to be associated in a suitable compartment of an aircraft (not shown), may comprise an outer generally cylindrical casing structure 11 having longitudinally mounted therein a core structure 12, forming an annular passageway generally indicated at 13, which constitutes a fluid flow communication extending through the plant from a forwardly directed air inlet opening 14 to a rearwardly disposed exhaust nozzle 15. The usual operating components of the power plant 10 are arranged in axial alignment therein, and include an axial-flow compressor 19, a driving turbine 20 connected thereto by means of a shaft 21, an annular combustion apparatus 22, which is interposed in the passage 13 between the discharge end of the compressor and the inlet of the turbine. In operation, air entering the inlet opening 14 is compressed by the compressor 19 and delivered through passage 13 to the combustion apparatus 22. Fuel supplied to the combustion apparatus, by way of suitable means hereinafter more fully described, is burned in the stream of air under pressure, creating motive gases which are expanded through the turbine 20 and finally discharged to atmosphere through the nozzle 15, establishing a propulsive thrust.

The combustion apparatus 22 embodying the invention is preferably annular in form, although the features of the invention are readily adapted to be employed in combustion apparatus of the multiple-unit or cell type. According to the invention, as best illustrated in Fig. 2, the combustion apparatus 22 comprises a burner structure having outer and inner sectional annular walls 25 and 26, which form a generally diverging combustion chamber 27. The outer wall 25 may consist of an assembly of a number of overlapped sections or rings, including a curved forward section 29, while the inner wall 26 may likewise constitute an assembly including a forward section 30, which is concentric with the outer section 29. Suitable inlets 31 for secondary air may be formed in the walls 25 and 26, by means of spacers interposed between the overlapping portions of the assembly sections. The forward wall sections 29 and 30 are imperforate and may be supported on radially disposed struts (not shown) extending between the inner and outer casings 12 and 11. The upstream portions of the forwardly disposed wall sections 29 and 30 are inswept to form a relatively narrow annular primary air entryway 33.

An annular baffle or header 35 is transversely disposed between the downstream portions of the wall sections 29 and 30 and may be secured thereto in any suitable manner, such as by means of annular angle members 37 and 38 welded to the respective sections. The baffle 35 thus separates the combustion chamber 27 from a diffuser space 36 defined between sections 29 and 30 and communicating with the passage 13 by way of entryway 33.

A plurality of tubes 40 are supported in suitable apertures 39 formed in the baffle 35. The inlet ends 40a of the tubes project slightly into the diffuser space 36 and the major portions thereof extend into the combustion chamber 27 and terminate in retrorse discharge ends 40b. Suitable fuel supply means, including fuel conduits 41, may be provided for delivering fuel at a controlled rate of flow into the inlet ends 40a of the respective tubes, such fuel being adapted to be propelled through the tubes by the stream of air flowing therethrough from the diffuser space 36 and issuing in counterflow relation into the combustion chamber 27.

According to the invention, each of the tubes 40 is associated with one or more of a plurality of spaced turbulence-promoter ducts 43, which are mounted on the baffle 35 for admitting primary air to the combustion chamber 27 adjacent or near the point at which substantially vaporized fuel is discharged in a counterflow direction by way of the fuel supply tubes 40. As best shown in Figs. 2 and 4 of the drawing, each of the ducts 43 comprises a cup-shaped body having an open inlet end 44 encompassed by an annular flange 45, and a partially closed end having a transversely formed discharge slot 46. As shown in Fig. 4, one end of the slot 46 may extend into the side wall of the duct. Each flange 45 is adapted to be welded to an annular surface of the baffle 35 surrounding one of a suitable number of openings 48, which are provided for receiving the several ducts.

A bail element 50 is mounted on each of the ducts 43, in straddling relation to the slot 46 therein, the opposite legs of the bail element being preferably welded to the tubular side surface of the duct so that the central portion is spaced outwardly of the slot. For dispersing the stream of air issuing from the slot, a short transversely disposed rod or wire 51 is welded intermediate its ends to the central portion of each bail element 50, the rod being thus suspended in spaced parallel alignment with the slot. As shown in Fig. 3, the ducts 43 may be variously arranged to present the slots and the rods 51 in angular relation with respect to the corresponding tubes 40.

It will be understood that the relatively reduced fluid pressure prevailing in the combustion chamber 27 will at all times maintain flow of air thereto from the diffuser space 36, in which some of the velocity of the air flowing through the entryway 33 is converted to pressure in the usual manner. In operation of the combustion apparatus, the flow pattern of primary air entering the combustion chamber 27 through the plurality of ducts 43 will then be effectively broken up upon impingement of the air stream on the rounded rods 51, creating local turbulence that will promote rapid mixing of primary air and vaporized fuel, and consequently improving the flame propagation velocity characteristics of the combustion reaction in chamber 27.

Due to the close relationship that has been found to exist between the turbulence of the fuel-air mixture and the flame length, the promotion of turbulence in the ignition and reaction zones of the combustion will thus ensure a high rate of energy release and maximum efficiency of the power plant.

While the invention has been shown in but one form, it will be obvious to those skilled in the art that it is not so limited, but is susceptible of various changes and modifications without departing from the spirit thereof.

What is claimed is:

1. Combustion apparatus comprising casing structure forming a passageway through which air under pressure is propelled at high velocity, burner shell structure interposed in said passageway and having a combustion chamber of short length and lateral apertures connecting said passageway to said chamber for supplying secondary air thereto, fuel supply means mounted in the upstream end of said shell for introducing fluid fuel into said combustion chamber, a primary air inlet tube mounted in an upstream wall of said burner shell structure adjacent said fuel supply means, said tube having an axial-flow inlet opening at the upstream end thereof communicating with said passageway in advance of said shell structure, said tube having a discharge slot disposed near to the point of fuel discharge in said combustion chamber, a support element carried by said tube and straddling said slot, and a rod member secured to said support element in parallel spaced relation to said slot for effecting turbulence of primary air issuing therethrough, whereby rapid turbulent mixing of fuel and air is facilitated for promoting high flame velocity and efficient combustion in a zone of short length.

2. Combustion apparatus comprising casing structure forming a passageway through which air under pressure is propelled at high velocity, burner shell structure interposed in said passageway and having formed therein a combustion chamber of short length and lateral aperatures connecting said passageway to said combustion chamber for supplying air thereto, fuel supply means mounted in the upstream end of said shell structure for introducing fluid fuel into said combustion chamber, an air inlet duct disposed in the upstream end of said shell structure adjacent said fuel supply means comprising a cup-shaped body having an inlet opening formed in one end thereof and a transversely disposed discharge slot formed in the opposite end, a bail member straddling said discharge slot and having both ends secured to said body, and a rod element secured intermediate its ends to said bail member and supended in spaced parallel alignment relative to said discharge slot for effecting turbulence and dispersion of air flowing therethrough from said passageway, whereby a flame reaction of high velocity and short length is promoted.

FLOYD T. HAGUE.

References Cited in the file of this patent

UNITED STATES PATENTS

| Number | Name | Date |
|---|---|---|
| 2,187,779 | Gardner | Jan. 23, 1940 |
| 2,375,528 | De Flon | May 8, 1945 |
| 2,522,081 | Allen | Sept. 12, 1950 |
| 2,541,171 | McGarry | Feb. 13, 1951 |